(12) United States Patent
Berstler (10) Patent No.: US 9,146,816 B2
(45) Date of Patent: Sep. 29, 2015

(54) MANAGING SYSTEM IMAGE BACKUP (75) Inventor: Justin J. Berstler, Wake Forest, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 423 days.

(21) Appl. No.: 13/517,659

(22) Filed: Jun. 14, 2012

(65) Prior Publication Data

US 2013/0339307 A1 Dec. 19, 2013

(51) Int. Cl.
*G06F 17/30* (2006.01)
*G06F 11/14* (2006.01)

(52) U.S. Cl.
CPC ...... *G06F 11/1453* (2013.01); *G06F 17/30073* (2013.01)

(58) Field of Classification Search
None
See application file for complete search history.

(56) References Cited

U.S. PATENT DOCUMENTS

| 5,751,997 | A | 5/1998 | Kullick et al. | |
|---|---|---|---|---|
| 7,197,520 | B1 | 3/2007 | Matthews et al. | |
| 7,603,391 | B1 | 10/2009 | Federwisch et al. | |
| 8,176,272 | B2 * | 5/2012 | Augenstein et al. | 711/162 |
| 8,676,761 | B1 * | 3/2014 | Dutch et al. | 707/640 |
| 8,676,809 | B1 * | 3/2014 | Naftel | 707/746 |
| 2004/0153478 | A1 | 8/2004 | Igouchkine | |
| 2011/0113012 | A1 * | 5/2011 | Gruhl et al. | 707/646 |

FOREIGN PATENT DOCUMENTS

EP 1796002 A2 6/2007

OTHER PUBLICATIONS

"Mac 101: Time Machine", Apple Computer, published on the world wide web at http://support.apple.com/kb/HT1427.

* cited by examiner

*Primary Examiner* — Rehana Perveen
*Assistant Examiner* — Hung Havan
(74) *Attorney, Agent, or Firm* — Paul S. Drake (57) ABSTRACT

A method, system or computer usable program product for backing up a system image including receiving a request to backup a first system image on a first computer system onto a server, selecting a similar system image from a catalog of images, identifying a first set of differences between the similar system image and the first system image, and backing up the first system image by transferring the first set of differences to the server.

20 Claims, 7 Drawing Sheets

MANAGING SYSTEM IMAGE BACKUP

BACKGROUND

1. Technical Field

The present invention relates generally to backing up a system, and in particular, to a computer implemented method for backing up differences from a prior system image.

2. Description of Related Art

Enterprises and individuals often backup their locally stored computer data in a remote location. On primary reason for such data redundancy is to restore the locally stored data after a data loss event such as a hard disk crash. Another purpose is to periodically retain copies of data for possible future use according to data retention policies. These data retention policies may be established and implemented for various business and legal data archival purposes including disaster recovery, statutory and judicial legal requirements, historical analysis, etc. The data being backed up may include general data, data formats, permissions, system configurations, etc.

An effective method of backing up locally stored computer data is to store a complete image of the computer system to a remote location. This would allow for easy reconstruction of the computer system in case of a partial or complete loss of computer data. One simple technique is to repeatedly store a complete image of the computer system to a remote location. This may be performed periodically, upon certain events such as when the computer system is to be shut down, or upon user request.

Another effective method of backing up locally stored computer data is to initially store a complete image of the computer system to a remote location, followed by storing incremental copies based on changes since the last update. Various techniques may be used to determine which portions of the computer system data has been modified since a previous backup. As a result of this approach, the amount of time required to perform each incremental backup is reduced, although reconstructing a complete image of the computer system may require going through the initial backup and multiple incremental backups.

SUMMARY

The illustrative embodiments provide a method, system, and computer usable program product for backing up a system image including receiving a request to backup a first system image on a first computer system onto a server, selecting a similar system image from a catalog of images, identifying a first set of differences between the similar system image and the first system image, and backing up the first system image by transferring the first set of differences to the server.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Steps may be taken to back up a system image. These steps may be taken as will be explained with reference to the various embodiments below.

Figure 1:
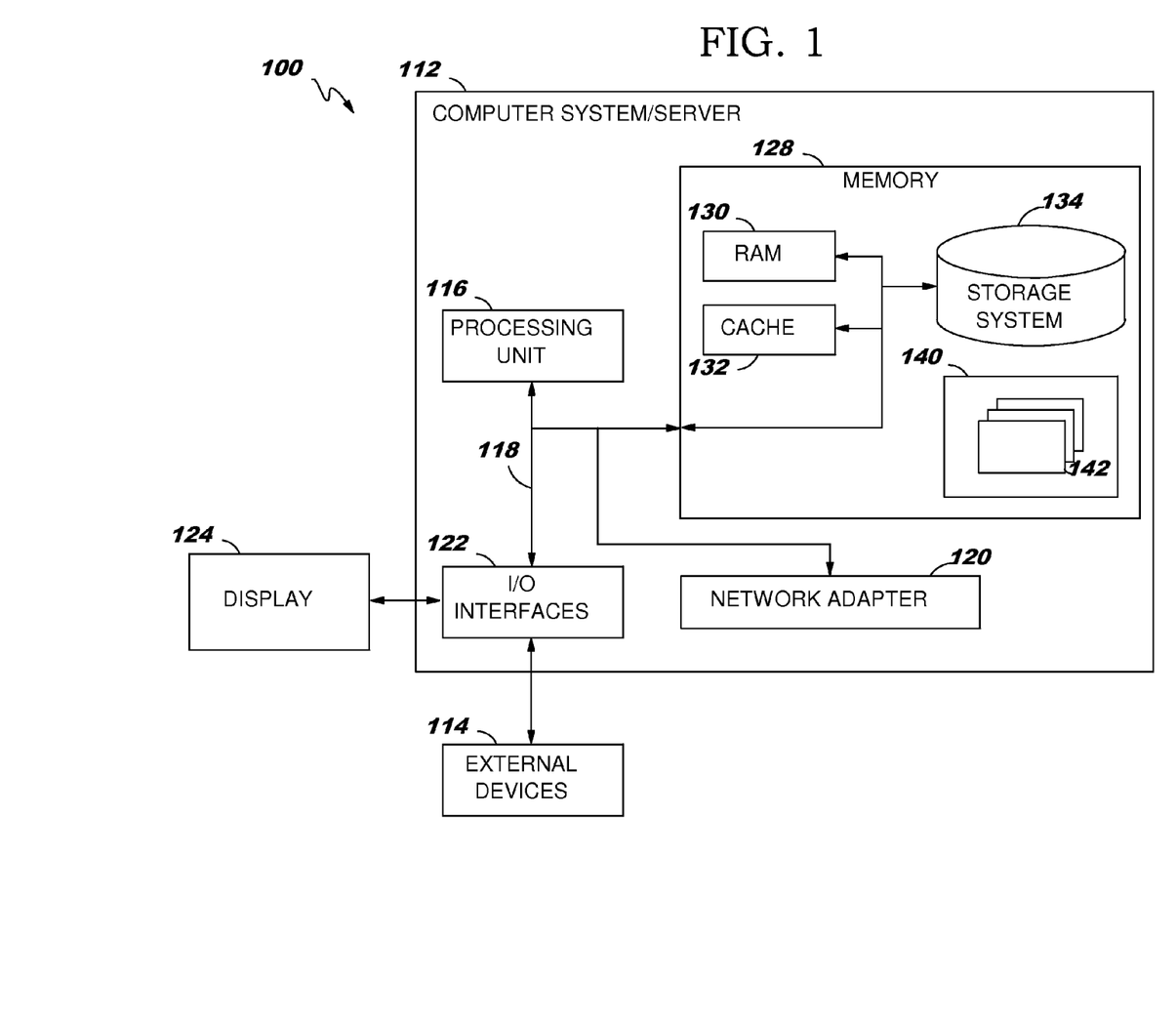
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for backing up a system image.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
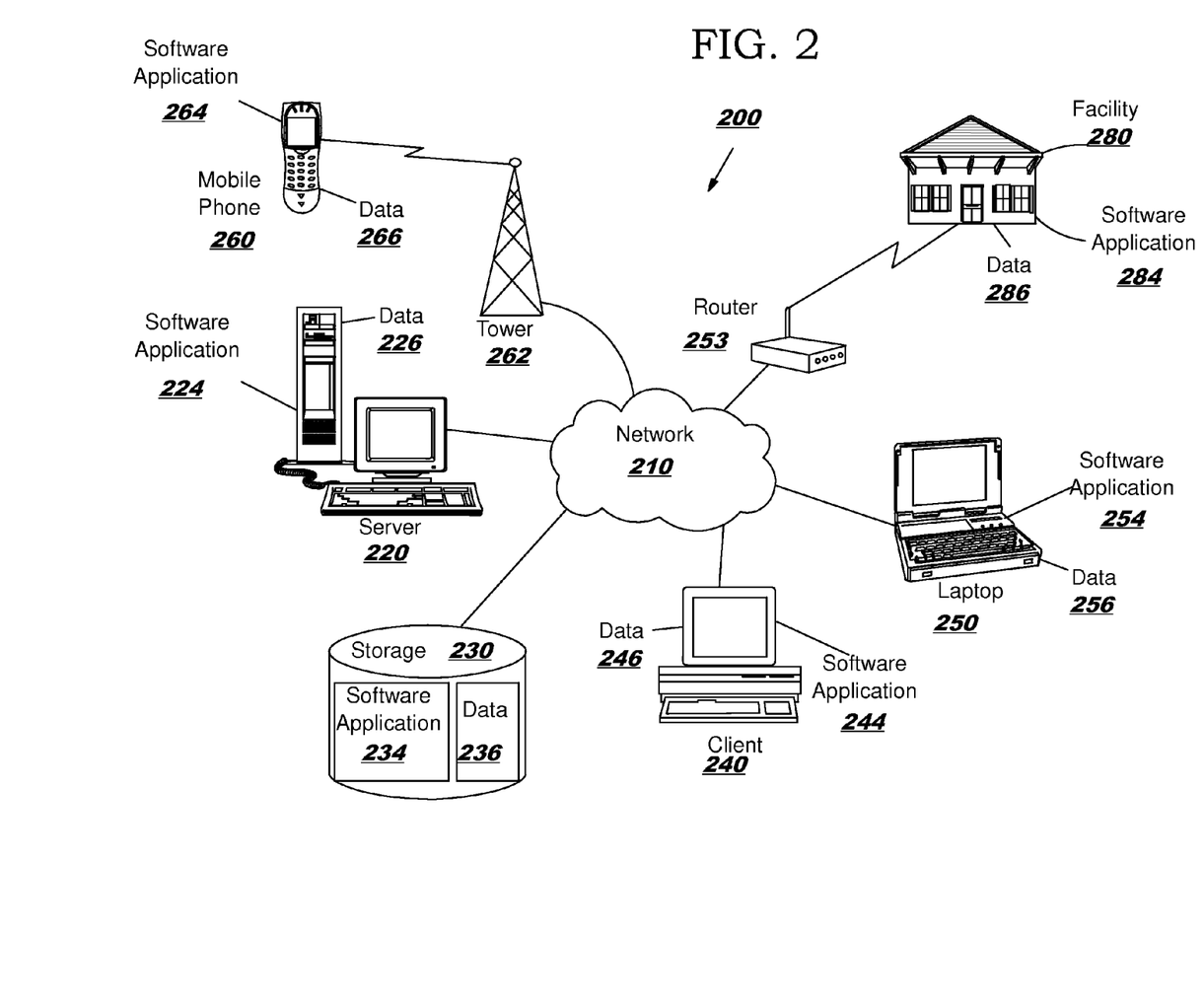
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing backup processes and storage or other software applications in accordance with embodiments described herein. Storage 230 may contain software application 234 and a content source such as data 236 for storing backup data from other devices. Other software and content may be stored on storage 230 for sharing among various computer or other data processing devices. Client 240 may include software application 244 and data 246. Laptop 250 and mobile phone 260 may also include software applications 254 and 264 and data 254 and 266. Facility 280 may include software applications 284 and data 286. Other types of data processing systems coupled to network 210 may also include software applications. Software applications could include a web browser, email, or other software application that can remotely backup data from other devices.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Typically in a client server environment such as a business enterprise, one or more standard system images are utilized by an IT (information technology) department to set up each standard client. These system images will include an operating system, standard software applications and utility applications utilized throughout the enterprise, etc. The enterprise may have multiple system images due to different types of computer systems utilized (e.g. laptops, desktop computers), due to different types of functions (e.g. engineering, accounting), etc. Other types of environments may also utilize starter system images such as governmental or even certain cloud environments. In addition, manufacturers and sellers of computer systems often provide standard configurations or images of software.

These system images may also be utilized during a backup process. That is, rather than backing up a complete copy of a computer system, only that portion of the computer system different from the system image may be backed up. This would significantly reduce the amount of time needed to initially backup a given system and may reduce the total amount of data needed to backup multiple computer systems.

Figure 3:
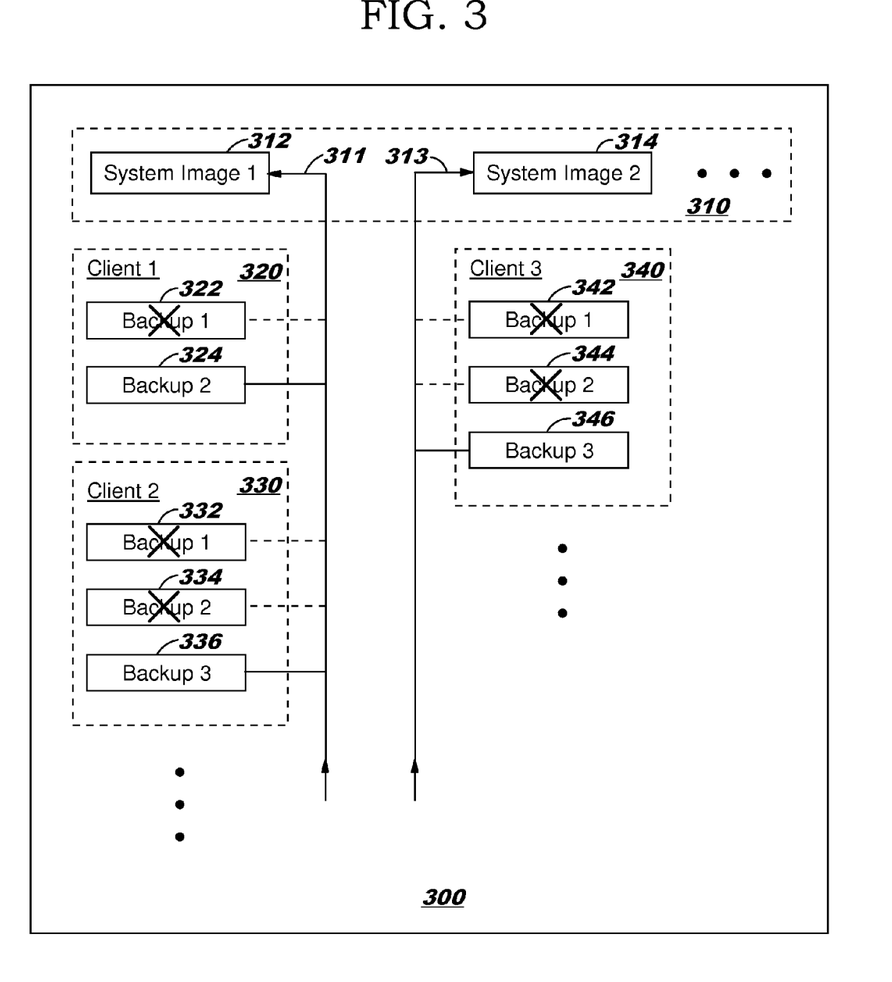
FIG. 3 is a block diagram illustrating multiple backups for multiple clients in accordance with a first embodiment.

FIG. 3 is a block diagram illustrating multiple backups for multiple clients in accordance with a first embodiment. This embodiment may be implemented in a typical enterprise wide client server environment or in a distributed environment across the internet. For example, each client may be a separate customer seeking backup services of a third party supplier in the cloud. Such a supplier may be a standalone service for providing backups, a seller of computer systems providing backups as a selling incentive, or other entity providing backups for multiple clients across a network or the internet. The clients are computer systems such as laptops and desktop computer, but may also be other types of computer systems such as mobile phones, routers, DVRs, television systems, gaming systems, etc.

In this embodiment, the equivalent of a complete image is backed up each backup. That is, in this embodiment a backup copy of computer system data is not dependent on any prior backups to reconstruct that computer system data. A memory 300 is shown which may be a server memory 226 or other types of remote data storage such as storage 230 of FIG. 2. Memory 300 may be used to backup memory, also referred to herein as an image or system image, from other systems such as client data 246, laptop data 256 or even other types of systems such as mobile phone data 266 or facility data 286.

In this embodiment, a set of system images, referred to herein as a catalog 310, includes two different system images shown as system image 1 312 and system image 2 314. Additional system images may be available, although two such images are shown here for illustrative purposes. These system images may have been utilized for setting up standard desktops and laptops within an enterprise or they may have been created from other clients previously backed up. The system images could include an operating system, certain software applications, certain device drivers, as well as other standard software and data from configuring a computer system. These system images may include a set of header information including file names, paths of the files in a directory structure, etc. This header information may include links that point to other remote locations where the actual system image files may be stored.

A client 1 320 is shown which has been backed up twice. In this case, client 1 was initially setup with system image 1 312 as indicated by line 311. In the first backup, only those files of client 1 not in system image 1 are stored in backup 1 322, thereby significantly reducing the amount of data transmitted and stored in memory 300. A second backup is also shown as backup 2 324. During each backup, a client 1 system image, including software and data on the client 1 system not in system image 1, is backed up even if that same data was backed up previously. A new version of an old file is considered a new file and would need to be backed up (or at least the new or modified portion of that file depending on the type of file and the sophistication of the backup program). This process simplifies the backup process and also results in a single backup copy for a given client (backup 324 in this example). As a result, upon the completion of backup 324, backup 322 may be erased, as shown with a large X, as it is now out of date. However, data retention policies may require that prior backups be retained, although they may be offloaded or otherwise archived to cheaper remote storage.

Backup 1 and backup 2 of client 1 may each include a set of header information including file names, paths of the files in a directory structure, etc. The header information may include links that point to files in that backup or to files stored in system image 1 as indicated by line 311. For example, if a given file of client 1 is located in system image 1, then when backup 2 is generated a link in the backup 2 header would point to the location of that file in system image 1, thereby avoiding the need to copy that file in backup 2.

There are several techniques which may be utilized to determine which software or data in the client is not in the relevant system image. An index of the system image may be used to identify which files on a client system are not already stored in the system image. In an alternative, when the system image was downloaded to the client system, a date of that download may have been set either on the client system or the server system. Any files younger than the download date would be new files or contain new data, so those new files would be backed up.

A client 2 330 is shown which has been backed up three times. In this case, client 2 was initially setup with system image 1 312 as indicated by line 311. In the first backup, only those files of client 2 not in system image 1 are stored in backup 1 332, thereby significantly reducing the amount of data transmitted and stored in memory 300. Additional subsequent backups are also shown as backup 2 334 and backup 3 336. During each backup, a client 2 system image, including software and data on the client 2 system not in system image 1, is backed up even if the same data was backed up previously. A new version of an old file is considered a new file and would need to be backed up. This process simplifies the backup process and also results in a single backup copy (backup 336 in this example). In addition, only a single copy of the data in common with client 2 (system image 1) is stored in memory 300, further reducing the amount of data transmitted and stored. Also, upon the completion of backup 336, backup copies 332 and 334 may be erased, as shown with a large X, as they are now out of date. However, data retention policies may require that prior backups be retained, although they may be offloaded or otherwise archived to cheaper remote storage.

Backup 1, backup 2 and backup 3 of client 2 may each include a set of header information including file names, paths of the files in a directory structure, etc. The header information may include links that point to files in that backup or to files stored in system image 1 as indicated by line 311. For example, if a given file of client 2 is located in system image 1, then when backup 1 is generated a link in the backup 1 header would point to the location of that file in system image 1, thereby avoiding the need to copy that file in backup 1.

A client 3 340 is shown which has been backed up three times. In this case, client 3 was initially setup with system image 2 314 instead of system image 1 as indicated by line 313. In the first backup, only those files of client 3 not in system image 2 are stored in backup 1 342, thereby significantly reducing the amount of data transmitted and stored in memory 300. Additional subsequent backups are also shown as backup 2 344 and backup 3 346. During each backup, a client 3 system image, including software and data on the client 3 system not in system image 2, is backed up even if the same data was backed up previously. A new version of an old file is considered a new file and would need to be backed up. This process simplifies the backup process and also results in a single backup copy (backup 346 in this example). As a result, upon the completion of backup 346, backup copies 342 and 344 may be erased, as shown with a large X, as they are now out of date. However, data retention policies may require that prior backups be retained, although they may be off-loaded or otherwise archived to cheaper remote storage.

Backup 1, backup 2 and backup 3 of client 3 may each include a set of header information including file names, paths of the files in a directory structure, etc. The header information may include links that point to files in that backup or to files stored in system image 2 as indicated by line 313. For example, if a given file of client 3 is located in system image 2, then when backup 3 is generated a link in the backup 3 header would point to the location of that file in system image 2, thereby avoiding the need to copy that file in backup 3.

Additional clients may be backed up, although three such clients are shown here for illustrative purposes. As described above, only that portion of a client not in the starter system image is backed up, thereby significantly reducing the amount of data transmitted and stored in memory 300. There could be additional clients backed up for each image shown or for other images not shown. In the case of system image 1, only one copy of the system image is stored on the server for two different clients. As a result, less data needs to be stored as this reduces the number of duplicate copies that may be needed of the system image. In the case of hundreds or even thousands of clients that were setup using the same system image, the reduction in duplicates results in significant storage savings. This is in addition to the reduction in data that is downloaded during each backup.

Figure 4:
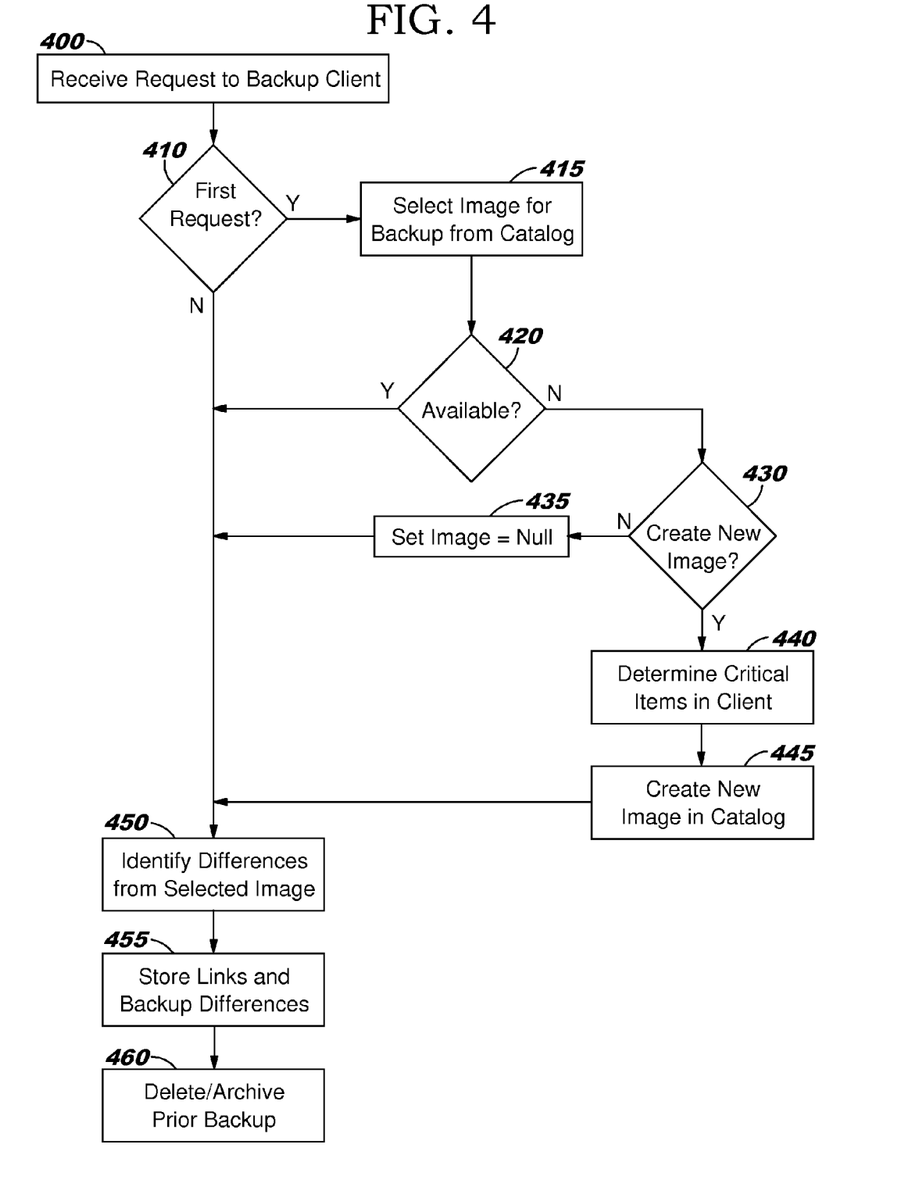
FIG. 4 is a flow diagram of a backup process in accordance with a first embodiment.

FIG. 4 is a flow diagram of a backup process in accordance with a first embodiment. As described above, in this embodiment a backup copy of computer system data is not dependent on any prior backups to reconstruct that computer system data. In a first step 400, the server or other device performing the backup receives a request to perform a backup of a system image for a client or other computer system. This request may come from the client, from a calendaring system on the server, or from other approved sources within an enterprise or other entity. The server then determines in step 410 whether this is the first backup for this client. If not, then processing continues to step 450 below. If yes, then in step 415 a similar system image is identified and selected from a set of system images referred to herein as a catalog.

Subsequently in step 420 it is determined whether a system image was available and selected. If yes, then processing continues to step 450, otherwise processing continues to step 430.

In step 430, the server determines whether a new system image should be created from the client that does not match any existing system image in the catalog. Several factors could be utilized to make this determination such as the version of the client operating system or the model of the client computer system. This decision may be made manually by requiring input from a user. Additionally, this decision may be made automatically based on factors such as the version of the client operating system. If the client operating system or computing system is old, then this client may be the only client with this profile, so no system image is created. If the client operating system or computing system is very new, then it may be the first of many such upcoming clients with the same or similar profile, so a new system image should be created in the catalog. If no in step 430, then in step 435 the system image is set to null, indicating that there is no corresponding system image, and processing continues to step 450. If yes in step 430, then processing continues to steps 440 and 445 before proceeding to step 450.

In step 440, the critical or important items of a client are identified. For example, the operating system, major software applications, configuration data, etc. These are the items that may be in common with other clients. Once identified, a new system image is created in the catalog based on these critical items. Processing then continues to step 450.

In step 450 differences between the client system image and the selected system image are identified. For example, a new version of an old file is considered a new file and would need to be backed up. These differences may be identified based on the date of each client file, an index of the selected system image may be compared to the files in the client, or other techniques may be performed which may be known to one of ordinary skill in the art. Once identified, these differences are backed up in step 455 along with header information including links to copies of files in the selected starter image. In the first backup, only that portion of the client not in the selected system image is backed up, thereby significantly reducing the amount of data transmitted and stored in memory. For subsequent backups, any prior copies of the client may be deleted, erased, suspended or otherwise disposed of or archived in step 460 according to any data retention policies which may apply.

Figure 5:
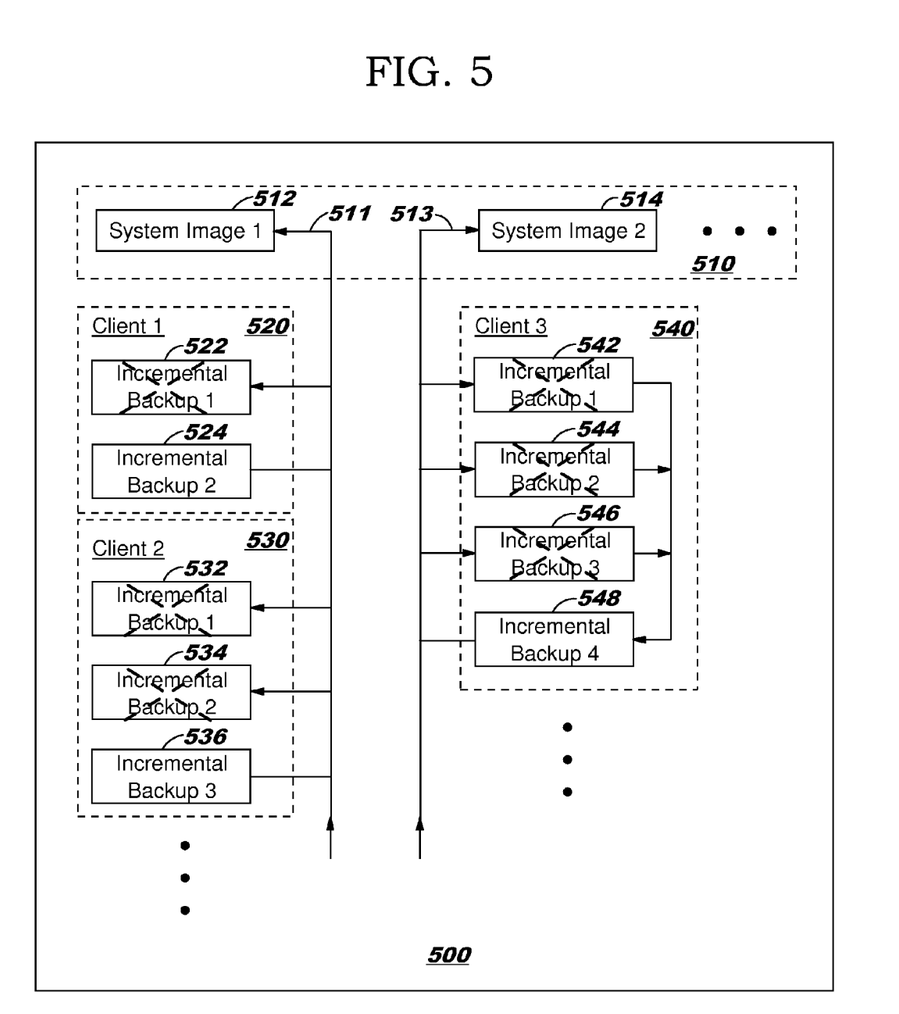
FIG. 5 is a block diagram illustrating multiple backups for multiple clients in accordance with a second embodiment.

FIG. 5 is a block diagram illustrating multiple backups for multiple clients in accordance with a second embodiment. This embodiment may be implemented in a typical enterprise wide client server environment or in a distributed environment across the internet. For example, each client may be a separate customer seeking backup services of a third party supplier in the cloud. Such a supplier may be a standalone service for providing backups, a seller of computer systems providing backups as a selling incentive, or other entity providing backups for multiple clients across a network or the internet. The clients may be computer systems such as laptops and desktop computer, but may also be other types of computer systems such as mobile phones, routers, DVRs, television systems, gaming systems, etc.

In this embodiment, only incremental backups are performed at any time. That is, in this embodiment a backup copy of computer system data may be dependent on prior backups to reconstruct that computer system data. This reduces the amount of data transmitted for storage during each backup, but may create interdependency between backups unless the backups for a given client are consolidated. A memory 500 is shown which may be a server memory 226 or other types of remote data storage such as storage 230 of FIG. 2. Memory 500 may be used to backup memory from other systems such as client data 246, laptop data 256 or even other types of systems such as mobile phone data 266 or facility data 286.

In this embodiment, a set of system images, referred to herein as a catalog 510, includes two different system images shown as system image 1 512 and system image 2 514. Additional system images may be available, although two such images are shown here for illustrative purposes. These system images may have been utilized for setting up standard desktops and laptops within an enterprise. The system images could include an operating system, certain software applications, certain device drivers, as well as other standard software and data from configuring a computer system. These system images may include a set of header information including file names, paths of the files in a directory structure, etc. This header information may include links that point to other remote locations where the actual system image files may be stored.

A client 1 520 is shown which has been backed up twice. In this case, client 1 was initially setup with system image 1 512 as indicated by line 511. In the first backup, only those files of client 1 not in system image 1 are stored in backup 1 522, thereby significantly reducing the amount of data transmitted and stored in memory 500. A second incremental backup is also shown as backup 2 524. During each backup, a client 1 system image including software and data on the client 1 system not in system image 1 or previous backups is then backed up. For example, a new version of an old file is considered a new file and would need to be backed up (or at least the new or modified portion of that file depending on the type of file and the sophistication of the backup program). This process reduces the amount of data stored during each backup process thereby reducing the amount of bandwidth needed for each backup. As a result, upon the completion of backup 524, certain files in backup 522 may need to be retained for reconstructing the client if needed and other files may be deleted as indicated by the large dashed X on backup 522. However, due to data retention policies, those files not needed for subsequent incremental backups may be offloaded or otherwise archived to cheaper remote storage instead of being deleted.

Incremental backup 1 and incremental backup 2 of client 1 may each include a set of header information including file names, paths of the files in a directory structure, etc. The header information may include links that point to files in that backup or to files stored in system image 1 or prior incremental backups as indicated by line 511. For example, if a given file of client 1 is located in backup 1, then when incremental backup 2 is generated a link in the backup 2 header would point to the location of that file in backup 1, thereby avoiding the need to copy that file again in backup 2.

There are several techniques which may be utilized to determine which software or data of the client is not in the relevant system image or prior backups. An index of the system image and prior backups may be used to identify which files on a client system are not already stored in the system image or prior backups. In an alternative, when the system image was downloaded to the client system and at each backup process, a date of the download or the latest backup may have been set either on the client system or the server system. Any files younger than the download date would be new files or contain new data, so only those new files would be backed up in the latest backup copy. Additional techniques may be utilized to determine which files may have been erased from prior backups.

A client 2 530 is shown which has been backed up three times. In this case, client 2 was initially setup with system image 1 512 as indicated by line 511. In the first backup, only those files of client 2 not in system image 1 are stored in backup 1 532, thereby significantly reducing the amount of data transmitted and stored in memory 500. Additional subsequent incremental backups are also shown as backup 2 534 and backup 3 536. During each backup, a client 2 system image, including software and data on the client 2 system not in system image 1 or previous backups, is then backed up. A new version of an old file is considered a new file and would need to be backed up. This process reduces the amount of data stored during each backup process thereby reducing the amount of bandwidth needed for each backup. In addition, only a single copy of the data in common with client 2 (system image 1) is stored in memory 500, further reducing the amount of data transmitted and stored. Also, upon the completion of backup 536, certain files in backups 532 and 534 may need to be retained for reconstructing the client if needed and other files may be deleted as indicated by the large dashed X on backup 522. However, due to data retention policies, those files not needed for subsequent incremental backups may be offloaded or otherwise archived to cheaper remote storage instead of being deleted.

Incremental backup 1, backup 2 and backup 3 of client 2 may each include a set of header information including file names, paths of the files in a directory structure, etc. The header information may include links that point to files in that backup or to files stored in system image 1 or prior incremental backups as indicated by line 511. For example, if a given file of client 2 is located in system image 1, then when incremental backup 2 is generated a link in the backup 2 header would point to the location of that file in system image 1, thereby avoiding the need to copy that file in backup 2.

A client 3 540 is shown which has been backed up three times and then consolidated once. In this case, client 3 was initially setup with system image 2 514 as indicated by line 513. In the first backup, only those files of client 3 not in system image 2 are stored in backup 1 542, thereby significantly reducing the amount of data transmitted and stored in memory 300. Additional subsequent incremental backups are also shown as backup 2 544 and backup 3 546. The three backups are shown as Backup 1 542, backup 2 544 and backup 3 546. During each backup, a client 3 system image, including software and data on the client 3 system not in system image 2 or previous backups, is then backed up. A new version of an old file is considered a new file and would need to be backed up. This process reduces the amount of data stored during each backup process thereby reducing the amount of bandwidth needed for each backup. As a result, upon the completion of backup 546, certain files in backups 542 and 544 may need to be retained for reconstructing the client if needed and other files may be deleted as indicated by the large dashed X on backup 522. However, due to data retention policies, those files not needed for subsequent incremental backups may be offloaded or otherwise archived to cheaper remote storage instead of being deleted.

Backup 1, backup 2, backup 3 and backup 4 of client 3 may each include a set of header information including file names, paths of the files in a directory structure, etc. The header information may include links that point to files in that backup or to files stored in system image 2 or prior incremental backups as indicated by line 513. For example, if a first file of client 3 is located in system image 2 and a second file is located in incremental backup 2, then when incremental backup 4 is generated a first link in the backup 4 header would point to the location of that first file in system image 2 and a second link in the backup 4 header would point to the location of that second file in backup 2, thereby avoiding the need to copy those files again in backup 4.

Figure 6:
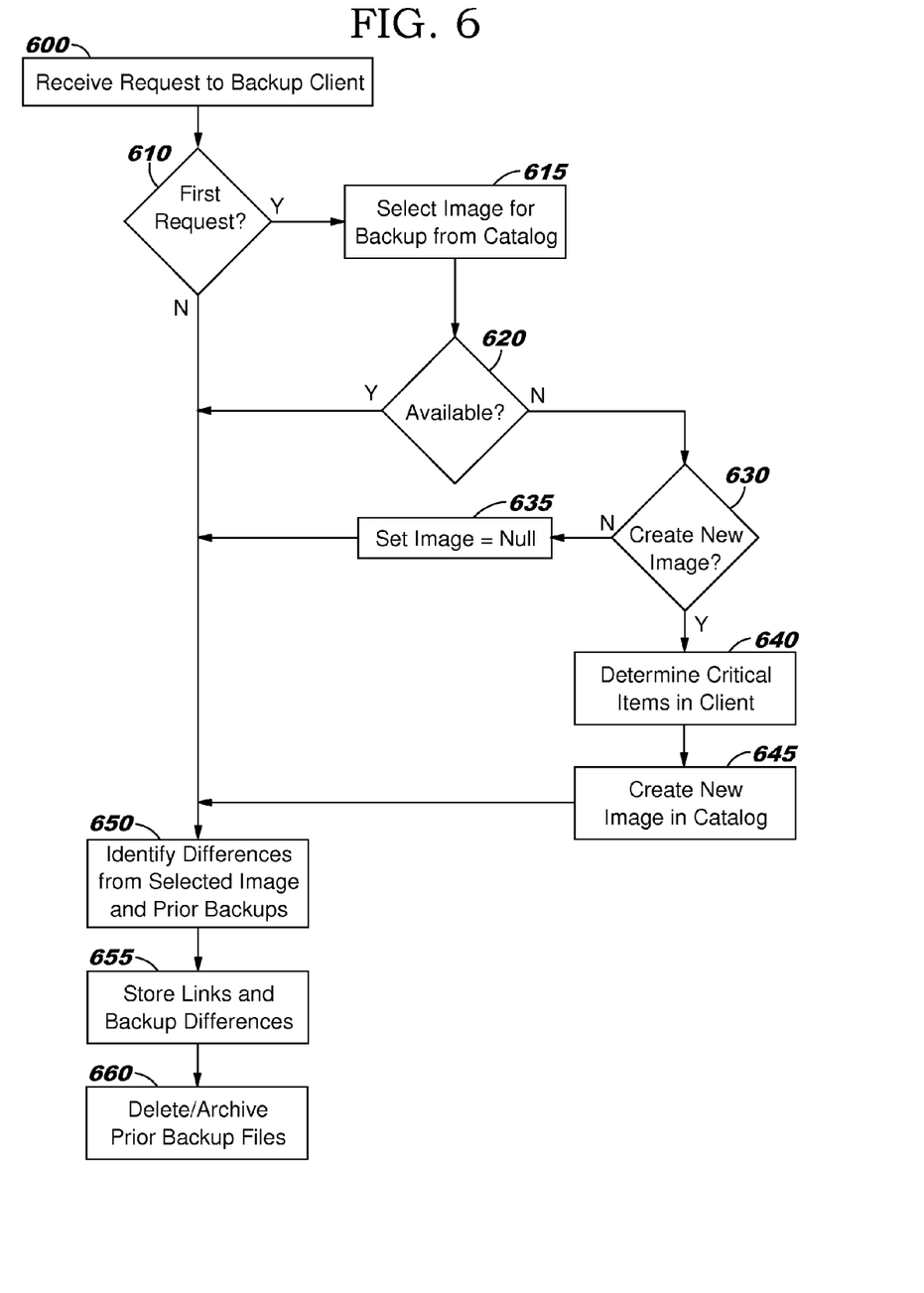
FIG. 6 is a flow diagram of a backup process in accordance with a second embodiment.

Additional clients may be backed up, although three such clients are shown here for illustrative purposes. As described above, only that portion of a client not in the starter system image or in prior incremental backups is backed up, thereby significantly reducing the amount of data transmitted and stored in memory 300. There could be additional clients backed up for each image shown or for other images not shown. In the case of system image 1, only one copy of the system image is stored on the server for two different clients. As a result, less data needs to be stored as this reduces the number of duplicate copies that may be needed of the system image. In the case of hundreds or even thousands of clients that were setup using the same system image, the reduction in duplicates results in significant storage savings. This is in addition to the reduction in data that is downloaded during each backup FIG. 6 is a flow diagram of a backup process in accordance with a second embodiment. As described above, in this embodiment a backup copy of computer system data may be dependent on prior backups to reconstruct that computer system data. This reduces the amount of data transmitted for storage during each backup, but may create interdependency between backups unless the backups for a given client are consolidated. In a first step 600, the server or other device performing the backup receives a request to perform a backup of a system image for a client or other computer system. This request may come from the client, from a calendaring system on the server, or from other approved sources within an enterprise or other entity. The server then determines in step 610 whether this is the first backup for this client. If not, then processing continues to step 650 below. If yes, then in step 615 a similar system image is identified and selected from a set of system images referred to herein as a catalog. Subsequently in step 620 it is determined whether a system image was available and selected. If yes, then processing continues to step 650, otherwise processing continues to step 630.

In step 630, the server determines whether a new system image should be created from the client that does not match any existing system image in the catalog. Several factors could be utilized to make this determination such as the version of the client operating system or the model of the client computer system. This decision may be made manually by requiring input from a user. Additionally, this decision may be made automatically based on factors such as the version of the client operating system. If the client operating system or computing system is old, then this client may be the only client with this profile, so no system image is created. If the client operating system or computing system is very new, then it may be the first of many such upcoming clients with the same or similar profile, so a new system image should be created in the catalog. If no in step 630, then in step 635 the system image is set to null, indicating that there is no corresponding system image, and processing continues to step 650. If yes in step 630, then processing continues to steps 640 and 645 before proceeding to step 650.

In step 640, the critical or important items of a client are identified. For example, the operating system, major software applications, configuration data, etc. These are the items that may be in common with other clients. Once identified, a new system image is created in the catalog based on these critical items. Processing then continues to step 650.

In step 650 differences between the client system image and the selected system image and prior client backups are identified. For example, a new version of an old file is considered a new file and would need to be backed up. These differences may be identified based on the date of each client file, an index of the selected system image may be compared to the files in the client, or other techniques may be performed which may be known to one of ordinary skill in the art. Once identified, these differences are backed up in step 655 along with header information including links to copies of files in the selected starter image and prior incremental backups. In the first backup, only that portion of the client not in the selected system image is backed up, thereby significantly reducing the amount of data transmitted and stored in memory. After subsequent backups, any copies of files no longer needed from prior backups may be deleted, erased, suspended or otherwise disposed of or archived in step 460 according to any data retention policies which may apply.

Figure 7A:
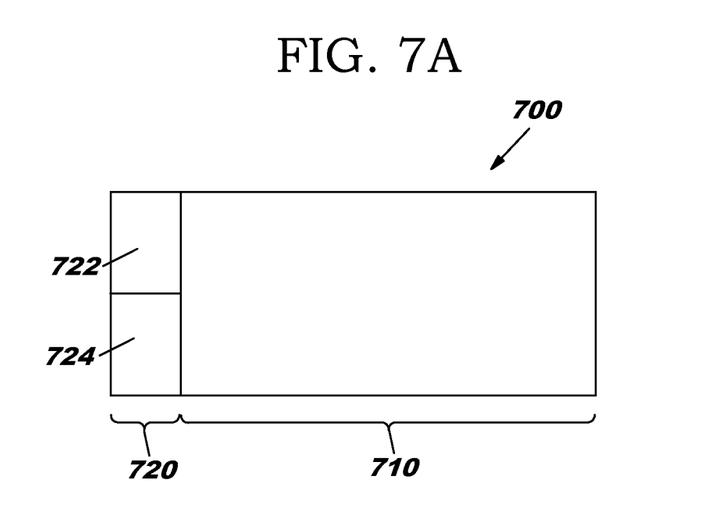
FIGS. 7A and 7B are block diagrams of a client backup in accordance with a first and a second embodiment.
Figure 7B:
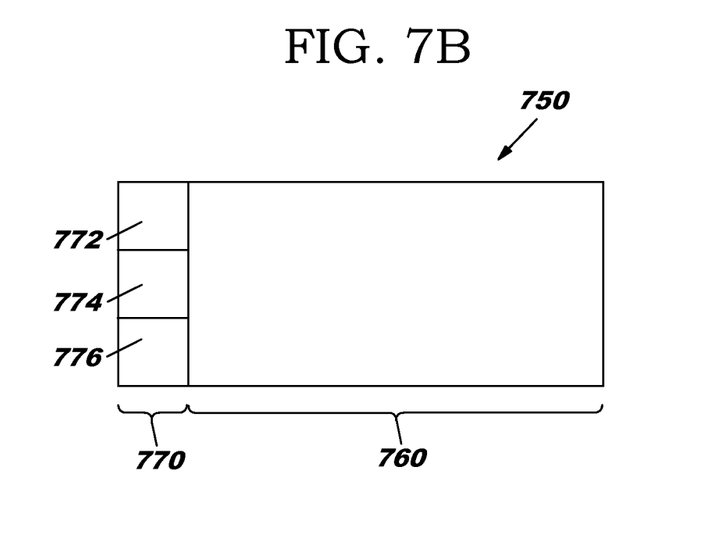

FIGS. 7A and 7B are block diagrams of a client backup in accordance with a first and a second embodiment. In FIG. 7A, a backup or system image 700 of a client in accordance with a first embodiment includes files 710 and a header 720. Files 710 include those files in the client not in the starter image referred to herein as differences. Header 720 may include a variety of information including links to files. Header 720 may include links 722 to files stored in a starter image (and not in the backup as a result). Header 720 may also include links 724 to files 710 stored in the current backup.

In FIG. 7B, a backup or system image 750 of a client in accordance with a second embodiment includes files 760 and a header 770. Files 760 include those files in the client not in the starter image or prior incremental backups referred to herein as differences. Header 770 may include a variety of information including links to files. Header 770 may include links 772 to files stored in a starter image (and not in the backup as a result) and links 774 to files stored in prior incremental backups. Header 770 may also include links 776 to files 760 stored in the current backup.

For both the first and second embodiments, only those portions of a client not in a selected system image are backed up. For a first backup of a given client, this is a significant reduction in data transmitted and stored in remote memory. Also for both embodiments only a single copy of a selected system image may be stored in remote memory for multiple clients, thereby significantly reducing the amount of data stored in memory, especially if the number of clients with a shared system image is in the hundreds, thousands or even more.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such software for backing up client data. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of backing up a system image comprising:
   receiving a request to perform an initial backup of a first system image on a first computer system onto a server;
   determining whether a similar system image with a similar profile to the first system image is available from a catalog of system images;
   upon a positive determination, selecting the similar system image from the catalog of system images;
   identifying a first set of differences between the similar system image and the first system image;
   backing up the first system image by transferring the first set of differences to the server;
   receiving a request to perform an initial backup of a second system image on a second computer system onto the server;
   determining whether a second similar system image with a similar profile to the second system image is available from the catalog of system images;
   selecting the second similar system image from the catalog of images;
   identifying a second set of differences between the second similar system image and the second system image; and backing up the second system image by transferring the second set of differences to the server.

2. The method of claim 1 wherein only the first set of differences are transferred from the first computer system to the server.

3. The method of claim 1 wherein the similar system image is an installation image previously used to generate a prior version of the first system image on the first computer system.

4. The method of claim 1 further comprising:
upon a negative determination, determining whether to generate a new system image for the catalog of system images from the first system image; and
upon a positive determination to generate a new system image, generate a new system image in the catalog of new images from the first system image.

5. The method of claim 4 further comprising:
wherein the catalog of system images including the new system image when determining whether a similar system image with a similar profile to the second system image is available from the catalog of system images.

6. The method of claim 1 further comprising:
receiving a second subsequent request to backup a later version of the first system image on the first computer system onto the server;
identifying a second set of differences between the later version of the first system image and a combination of the similar system image and the first set of differences; and
backing up the later version of the first system image by transferring the second set of differences to the server.

7. The method of claim 6 further comprising adding links to the second set of differences linking to files in the similar system image and in the first set of differences.

8. The method of claim 1 further comprising
receiving a request to perform an initial backup of a third system image on a third computer system onto the server;
determining whether a third similar system image with a similar profile to the third system image is available from the catalog of system images;
selecting the similar system image from the catalog of images;
identifying a third set of differences between the similar system image and the third system image; and
backing up the third system image by transferring the third set of differences to the server;
wherein the first set of differences and the third set of differences are differences from the same similar system image, thereby only requiring one copy of the similar system image on the server.

9. A computer usable program product comprising a computer usable storage medium including computer usable code for use in backing up a system image, the computer usable program product comprising code for performing the steps of:
receiving a request to perform an initial backup of a first system image on a first computer system onto a server;
determining whether a similar system image with a similar profile to the first system image is available from a catalog of system images;
upon a positive determination, selecting the similar system image from the catalog of system images;
identifying a first set of differences between the similar system image and the first system image;
backing up the first system image by transferring the first set of differences to the server;
receiving a request to perform an initial backup of a second system image on a second computer system onto the server;
determining whether a second similar system image with a similar profile to the second system image is available from the catalog of system images;
selecting the second similar system image from the catalog of images;
identifying a second set of differences between the second similar system image and the second system image; and
backing up the second system image by transferring the second set of differences to the server.

10. The computer usable program product of claim 9 wherein only the first set of differences are transferred from the first computer system to the server.

11. The computer usable program product of claim 9 wherein the similar system image is an installation image previously used to generate a prior version of the first system image on the first computer system.

12. The computer usable program product of claim 9 further comprising code for performing the steps of:
upon a negative determination, determining whether to generate a new system image for the catalog of system images from the first system image; and
upon a positive determination to generate a new system image, generate a new system image in the catalog of new images from the first system image.

13. The computer usable program product of claim 12 further comprising code for performing the steps of:
wherein the catalog of system images including the new system image when determining whether a similar system image with a similar profile to the second system image is available from the catalog of system images.

14. The computer usable program product of claim 9 further comprising code for performing the steps of:
receiving a request to perform an initial backup of a third system image on a third computer system onto the server;
determining whether a third similar system image with a similar profile to the third system image is available from the catalog of system images;
selecting the similar system image from the catalog of images;
identifying a third set of differences between the similar system image and the third system image; and
backing up the third system image by transferring the third set of differences to the server;
wherein the first set of differences and the third set of differences are differences from the same similar system image, thereby only requiring one copy of the similar system image on the server.

15. A data processing system for backing up a system image, the data processing system comprising:
a processor; and
a memory storing program instructions which when executed by the processor execute the steps of:
receiving a request for the processor to perform an initial backup of a first system image on a first computer system onto the memory of a server;
determining whether a similar system image with a similar profile to the first system image is available from a catalog of system images;
upon a positive determination, selecting the similar system image from the catalog of system images;
identifying a first set of differences between the similar system image and the first system image;

backing up the first system image by transferring the first set of differences to the server;

receiving a request to perform an initial backup of a second system image on a second computer system onto the server;

determining whether a second similar system image with a similar profile to the second system image is available from the catalog of system images;

selecting the second similar system image from the catalog of images;

identifying a second set of differences between the second similar system image and the second system image; and backing up the second system image by transferring the second set of differences to the server.

16. The data processing system of claim 15 wherein only the first set of differences are transferred from the first computer system to the server.

17. The data processing system of claim 15 wherein the similar system image is an installation image previously used to generate a prior version of the first system image on the first computer system.

18. The data processing system of claim 15 further comprising the steps of:

upon a negative determination, determining whether to generate a new system image for the catalog of system images from the first system image; and upon a positive determination to generate a new system image, generate a new system image in the catalog of new images from the first system image.

19. The data processing system of claim 18 further comprising the steps of:

wherein the catalog of system images including the new system image when determining whether a similar system image with a similar profile to the second system image is available from the catalog of system images.

20. The data processing system of claim 15 further comprising the steps of:

receiving a request to perform an initial backup of a third system image on a third computer system onto the server;

determining whether a third similar system image with a similar profile to the third system image is available from the catalog of system images;

selecting the similar system image from the catalog of images;

identifying a third set of differences between the similar system image and the third system image; and backing up the third system image by transferring the third set of differences to the server;

wherein the first set of differences and the third set of differences are differences from the same similar system image, thereby only requiring one copy of the similar system image on the server.

* * * * *